United States Patent [19]

Nonini et al.

[11] Patent Number: 4,969,313
[45] Date of Patent: Nov. 13, 1990

[54] PACKAGING MACHINE TO PACKAGE SECTIONS IN ALTERNATE LAYERS WITH ONE SINGLE SET OF MAGNETIC HEADS

[75] Inventors: Geremia Nonini, Buttrio; Bordignon, Giuseppe, Bicinicco, both of Italy

[73] Assignee: Danieli & C. Officine Meccaniche SpA, Buttrio, Italy

[21] Appl. No.: 271,589

[22] Filed: Nov. 15, 1988

[30] Foreign Application Priority Data

Dec. 3, 1987 [IT] Italy .................. 83508 A/87
Jul. 15, 1988 [IT] Italy .................. 83446 A/88

[51] Int. Cl.⁵ .................. B65B 5/10; B65B 35/50; B65B 35/56
[52] U.S. Cl. .................. 53/537; 53/244; 53/251; 53/540; 53/544; 414/791.4
[58] Field of Search .................. 294/88; 53/143, 244, 53/251, 537, 540, 544; 414/788.3, 791.4

[56] References Cited

U.S. PATENT DOCUMENTS

| | | | |
|---|---|---|---|
| 3,452,884 | 7/1969 | Tanqueray | 414/791.4 X |
| 3,880,296 | 4/1975 | Kaplan | 414/791.4 X |
| 3,957,163 | 5/1976 | Tänzler | 414/791.4 X |
| 4,184,800 | 1/1980 | Uchida et al. | 414/791.4 |
| 4,278,377 | 7/1981 | Elineau | 414/791.4 X |
| 4,392,765 | 7/1983 | Barton et al. | 414/791.4 X |
| 4,487,540 | 12/1984 | Buchheit | 414/791.4 X |
| 4,566,833 | 1/1986 | Gigante | 414/791.4 X |
| 4,648,770 | 3/1987 | Berz et al. | 414/791.4 X |

FOREIGN PATENT DOCUMENTS 0099863 2/1984 European Pat. Off. .
0196685 10/1986 European Pat. Off. .

Primary Examiner—Robert L. Spruill
Assistant Examiner—Linda B. Johnson
Attorney, Agent, or Firm—Wegner, Cantor, Mueller & Player

[57] ABSTRACT

Packaging machine to package sections in alternate layers with one single set of magnetic heads, which comprises a conveyor bench (11), an oscillatory arm (12) with a magnetic head (13) and an area (15) for the formation of packages (14), the conveyor bench (11) bearing alternate first and second layers (16-17) of sections wherein one layer comprises "N" sections whereas the next layer comprises "N minus 1" sections, each layer being defined by a pin (18), whereby the magnetic head (13) takes an upstream second layer (17) first, overturns it and places it on a previous first layer (16) located downstream and transfers both layers (16-17) onto a package (14) being formed after a relative vertical displacement as between the conveyor bench (11) and the oscillatory arm (12) at least during the step of transfer of the layers (16-17) onto the package (14) being formed, the packaging machine (10) being positioned below the conveyor bench (11) and at the side of the package (14) formation area (15).

16 Claims, 2 Drawing Sheets

PACKAGING MACHINE TO PACKAGE SECTIONS IN ALTERNATE LAYERS WITH ONE SINGLE SET OF MAGNETIC HEADS

This invention concerns a packaging machine to package sections in alternate layers with one single set of magnetic heads.

To be more exact, the invention concerns a machine to package sections which is able to arrange alternate layers of sections by employing one single set of magnetic heads.

The invention is especially suitable where a high rate of output is required and it is therefore necessary to avoid hold-ups or even very short stoppages of the feed and despatch cycle.

Machines which employ magnetic heads for the packaging of sections in alternate layers are known, and indeed many types are known.

Document No. EP-A-0.196.685 discloses a device to stack rolled bars, namely a first oscillatory arm that supports and prepositions a second oscillatory arm which in turn bears one or two magnets.

The device is located in front of the arrival surface of the bars, and the surface for forming stacks is positioned between the device and that arrival surface.

This device requires considerable free space in front of and above the arrival surface of the rolled bars and cannot always be installed.

Moreover, the positioning of the magnets requires continuous checking of the reciprocal positions of the various elements.

Document No. EP-A-0.099.863 discloses a device for the stacking of rolled bars which comprises a two-armed rotary lever keyed to and supported on a central shaft, the end of each arm of this lever being equipped with an oscillatory magnetic head.

To perform the stacking operation, the lever is brought to the neighbourhood of a layer of rolled bars lying on a conveyor belt; the magnetic heads lift the rolled bars from the belt; thereafter the lever is rotated to bring the layer of rolled bars to the neighbourhood of a discharge line; the magnetic heads are then demagnetized and the layer of rolled bars is released onto the discharge line.

Document No. DE-B-1.183.020 discloses a device to stack sections, whereby one layer of sections has to be turned by 180° in relation to the next layer so that packages of rolled sections can be formed with one layer fitted into the other.

This device provides a lifter rake which carries the bars onto a movable depositing table by means of a slotted-link guide.

Orientable arms equipped with electromagnets take the bars from the depositing table and arrange them on a stacking table.

Other devices employed to stack rolled bars or sections and based on the employment of electromagnets able to lift, and of arms able to transport, such rolled bars or sections are known from DE-B-1.235.811, DE-B-1.258.796 and DE-B-1.296.578.

Devices to stack bars or sections are also known which take the same from a depositing table and carry them above a stacking table.

All the known devices cited above are subject to shortcomings and drawbacks due to the complexity and cost of the lifting and carrying elements and to the relatively long transport times which, in general, do not enable bars arriving from a conveyor belt to be taken continuously.

This situation entails delays and downtimes in the successive processing shops in view of the high speeds and high output of modern rolling trains.

The present applicant has undertaken the problem of a packaging machine employing only one set of magnets to package sections arranged in alternate layers.

The invention tends also to package the sections in one-directional layers and to make packages with sections of various types and also to package them in three or more layers at a time.

He has also set himself the problem of embodying a compact packaging machine which can be positioned below the bench which conveys the sections.

He has also tackled the problem of a packaging machine which obviates lack of continuity in the processing line and empty spaces between the bench conveying the sections and the package being formed.

Another problem faced by this applicant is to obtain a high rate of output without even the shortest stoppages or interruptions due to coordination of the working steps.

He has also undertaken the problem of embodying a simple and reliable packaging machine.

Another problem tackled by the applicant is that of embodying magnetic heads without combs to position and support the sections.

According to the invention a plurality of oscillatory arms which act together and in unison to manipulate the sections is positioned below the bench conveying the sections in a position suitable to leave space for at least one layer of sections on the bench.

This plurality of oscillatory arms comprises at its end a coordinated set of magnetic heads able to take up at least two positions in relation to the plurality of arms.

For the sake of simplicity we shall write hereinafter about an oscillatory arm as meaning an plurality of oscillatory arms and about a magnetic head as meaning a coordinated set of magnetic heads.

With the oscillatory arm in a position to engage the sections, the magnetic head can cooperate in the upstream zone of the conveyor bench with the lower side of a layer of sections, whereas it can cooperate in the downstream zone with the upper side of a layer of sections already located on the conveyor bench.

With the oscillatory arm in this position, the stop which is included on the chains of the conveyor bench and which conditions the layer positioned momentarily upstream is located so as to coincide substantially with the part of the magnetic head closest to the oscillatory arm when the magnetic head is positioned so as to cooperate with that layer.

With the oscillatory arm in the same position, the stop which is included on the chains of the conveyor bench and which conditions the layer positioned momentarily downstream is located so as to coincide substantially with the part of the magnetic head furthest from the oscillatory arm when the magnetic head is positioned so as to cooperate with that layer.

According to a variant, in the position of engagement of the second layer means to lift the layer may be included which are suitable to lift that layer and to carry it in cooperation with the alternate layer already engaged by the magnetic head.

The magnetic head which is oriented upstream, therefore, takes "N minus 1" sections, lifts them and, in its rotation from upstream to downstream, overturns them and places them on the layer of "N" sections located in the downstream layer.

When placed on the layer of "N" sections, the "N minus 1" sections are positioned in the valley of the "N" sections. In this way two layers can be loaded at one time.

When the magnetic head has fixed the layer of "N minus 1" sections on the layer of "N" sections between the oscillatory arm and the conveyor bench and while the oscillatory arm begins rotating towards the end of the bench, a reciprocal vertical displacement takes place. This reciprocal vertical displacement has the effect that the magnetic head encounters no contacts while it is being displaced by the oscillatory arm towards the package of sections being formed.

When the magnetic head approaches the package being formed, it is substantially horizontal.

Having discharged the layers of sections, the magnetic head rotates backwards while the oscillatory arm rotates backwards to take up its loading position once more.

During its return step too there is a reciprocal vertical displacement as between the conveyor bench and oscillatory arm. This reciprocal vertical displacement as between the bench and the arm may take place in various ways.

A first system provides for at least the end part of the bench to be lowered and raised in relation to the position in which the magnetic head engages the sections.

A second system provides for the axis of oscillation of the oscillatory arm to be able to be raised and lowered in relation to the position of engagement of the sections.

Such movement can be obtained either by merely raising or lowering the pivot or by arranging for the pivot to be supported on a possibly rotary eccentric support.

A third system provides for the oscillatory arm to be able to be shortened or lengthened in relation to the position of engagement of the sections.

A fourth system provides for the oscillatory arm to be duplicated in the manner of a parallelogram.

In completion of the reciprocal displacement as between the oscillatory arm and the conveyor bench so as to prevent contacting of the magnetic head, it is possible to actuate a rotation of the magnetic head about its own axis of rotation.

Oscillation of the oscillatory arm may be produced mechanically or hydraulically.

The invention therefore provides a packaging machine to package sections in alternate layers with one single set of magnetic heads, the machine having the structure of the main claim and the features disclosed in the main claim or in one or another of the successive claims.

The attached figures, which are given as a non-restrictive example, show the following:

Figure 1:
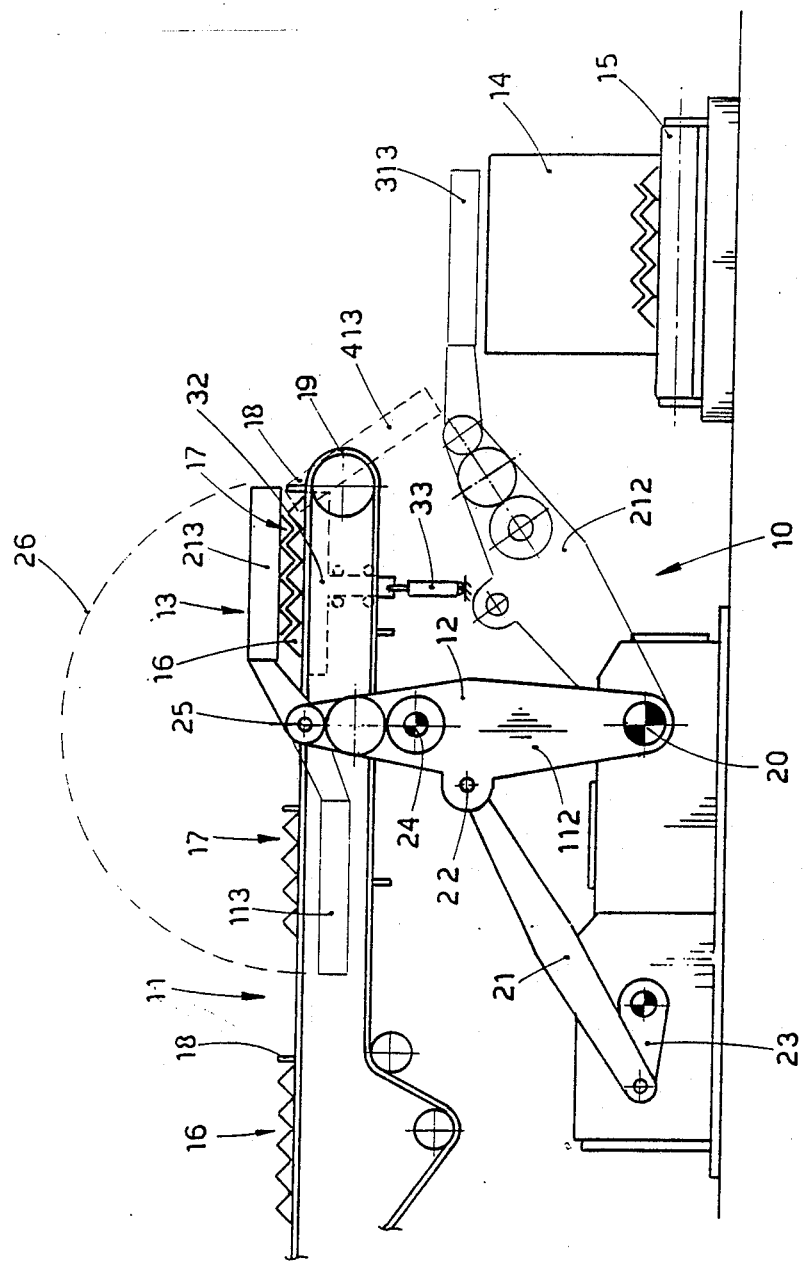
FIG. 1 shows a packaging machine according to the invention.

In the attached figures a packaging machine 10 comprises a conveyor bench 11, an oscillatory arm 12 with a magnetic head 13 and an area 15 for the formation of a package 14.

The conveyor bench 11 comprises a plurality of parallel chains 19, each of which includes a plurality of spaced pins 18 that position first and second layers of sections 16 and 17 rested on the bench 11.

The first and second layers 16 and 17 are alternated, one layer comprising a number "N" of sections, whereas the other layer comprises "N minus 1" sections.

The oscillatory arm 12 is pivoted on an oscillation pivot 20 and comprises at one end a shaft 25 on which the magnetic head 13 can rotate.

During its step of engagement of sections the magnetic head 13 takes up first a position 113 to engage the second layer 17 from below and next a position 213 to locate the overturned second layer 17 on the first layer 16.

According to the embodiment of FIG. 1 a means 32 to lift a layer, which can be actuated by an actuation means 33, a jack for instance, cooperates with position 213 to lift the first layer 16 and couple it to the second layer 17 secured to the magnetic head 13.

In moving from position 113 to position 213 the magnetic head 13 follows a path 26.

In position 113 the part of the magnetic head 13 closest to the oscillatory arm 12 cooperates with the pin 18 of the second layer 17, whereas in position 213 the part of the magnetic head 13 furthest from the oscillatory arm 12 cooperates with the pin 18 of the second layer 17.

When the magnetic head 13 in position 213 has anchored the first layer 16 too, a reciprocal vertical displacement takes place as between the bench 11 and the oscillatory arm 12, frees the magnetic head 13 of any contact and enables the oscillatory arm 12 to pass from its loading position 112 to a delivery position 212.

The loading position 112 of the arm is substantially constant, whereas the delivery position 212 can vary according to the height reached by the latest layer of sections placed on the package 14 being formed.

During the step of placement and delivery of sections a position 313 of the magnetic head 13 is in fact always substantially horizontal.

Oscillation of the oscillatory arm 12 can be produced by a crank 23 acting on an actuation arm 21 that cooperates with the oscillatory arm 12 through a pivot 22.

When a layer has been placed on the package 14 being formed, the magnetic head 13 passes from the delivery position 313 to a free position 413, while the arm 12 returns from its delivery position 212 to its loading position 112.

The free position 413 of the magnetic head 13 in relation to the oscillatory arm 12 may coincide with the engagement position 113 or be lower.

During the return of the oscillatory arm 12 from its delivery position 212 to its loading position 112, there takes place once more a reciprocal vertical displacement as between the oscillatory arm 12 and the bench 11.

Rotation of the magnetic head 13 about the shaft 25 can be obtained, for instance, by the action of one single shaft 24, which may get its motion from one or more positions, by means of a universal joint for instance or by means of a motor.

The shaft 24 can be clamped in relation to the horizontal so that with rotation of the oscillatory arm 12 and with the shaft 24 halted in relation to the horizontal the kinematic mechanisms connecting the shaft 24 to the shaft 25 rotate, keeping the magnetic head 13 in a required position in relation to the horizontal or making the magnetic head 13 carry out a required movement in relation to the horizontal.

The cycle described above takes place continuously without downtimes, stoppages or other interruptions. In fact, while the oscillatory arm 12 passes from its loading position 112 to its delivery position 212 and viceversa, the first and second layers 16–17 are replenished by continuous movement of the conveyor bench 11.

Figure 2:
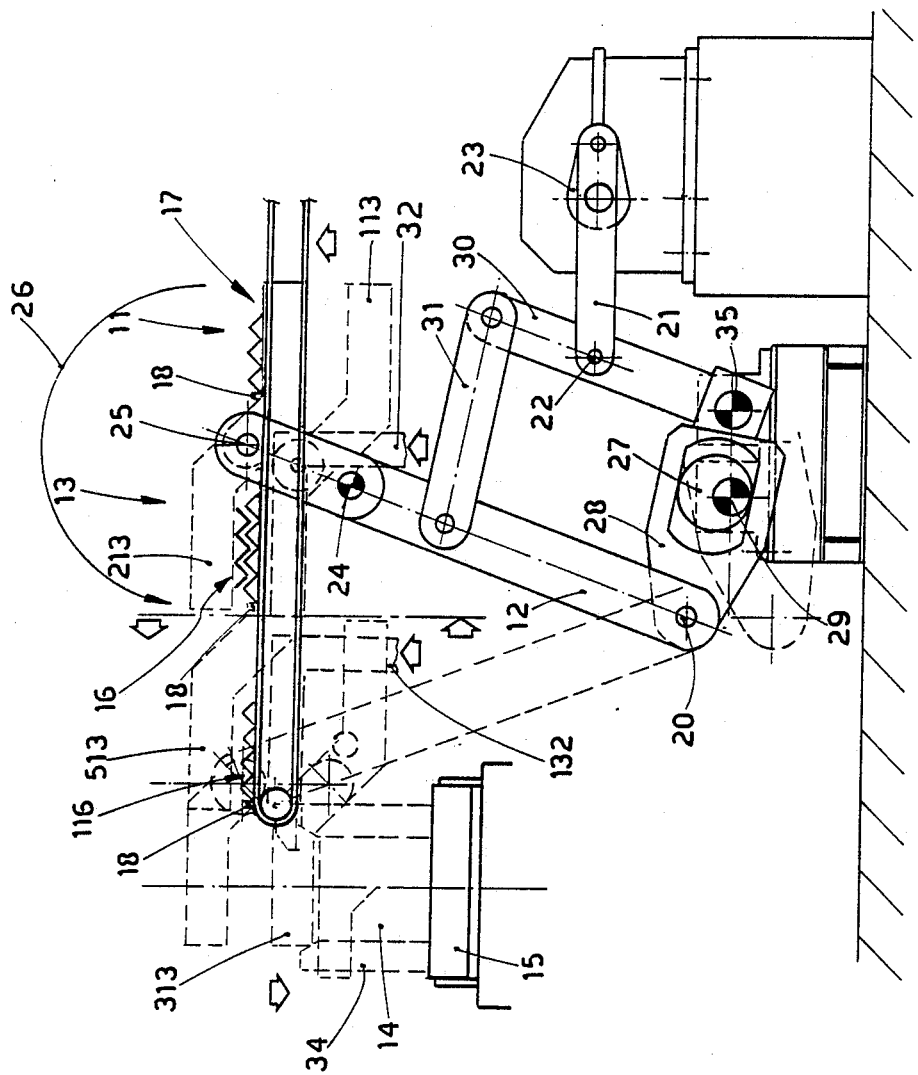
FIG. 2 shows a variant of the embodiment of FIG. 1.

In the embodiment of FIG. 2 the oscillatory arm 12 is fitted so as to be able to oscillate on a first pivot 20 of an oscillatory slotted link 28, which is pivoted on a second pivot 35 and actuated by a cam 27 able to rotate on a third pivot 29. The cam 27 may possess a required degree of lift.

An auxiliary arm 30 connected to the oscillatory arm 12 by a bar 31 is pivoted on the second pivot 35.

This lay-out enables the surface supporting the package 14 to be lifted, thus obviating foundations and other civil works.

Moreover, in the event of maintenance it is possible to withdraw the whole assembly from the work zone.

According to this embodiment, owing to the length of the conveyor bench 11 it is also possible to discharge bars at random into a space obtained with shoulders 34 so as to obtain packages consisting of a variety of sections.

According to the embodiment of FIG. 2 the magnet reaches the engagement position 113 below the second layer 17, is lifted, engages the second layer 17, rotates according to the arrow 26 to the layer location position 213 and receives the first layer 16 owing to the action of the means 32 that lifts that layer 16. It then moves laterally downwards to deliver the two alternate layers 16–17 to the package being formed 14; thereafter it rotates on the shaft 25 and re-starts the cycle.

The movement of the cam 27 in the oscillatory slotted link 28 together with the joints included and the clamping of the shaft 24 in relation to the horizontal enables the whole assembly to function properly.

According to a variant it is possible in the situation of FIG. 2 to engage three layers of sections for transfer to the package 14, the first and second layers being inverted in relation to each other while the third is positioned as one of the first two.

As is shown in FIG. 2, after having engaged the second layer 17, overturned it and assembled it with the first layer 16, the magnetic head 13 reaches an upstream position 513 and assembles also a third layer 116 owing to a second layer lifting means 132.

If the oscillatory arm 12 is suitably dimensioned, it is possible to assemble four layers at a time.

We claim:

1. A packaging machine to package sections in alternating layers using a single set of magnetic heads, comprising:
    a conveyor bench which delivers alternate first and second layers of sections, one of said first and second layers having N sections and the other of said first and second layers having N−1 sections, said conveyor bench having a plurality of pins which position the first and second layers on the conveyor bench;
    a package forming area for the formation of packages of a plurality of said first and second layers of sections; and
    transfer means for transferring said first and second layers from said conveyor bench to said package forming area and for forming packages at said package forming area, said transfer means being located adjacent to said package forming area, and comprising at least one oscillatory arm, means mounting said arm below said conveyor bench, and at least one magnetic head attached to said at least one oscillatory arm which can engage the layers;
    wherein said transfer means engages one of said second layers located on said conveyor bench, inverts said one of said second layers, engages one of said first layers, said one of said first layers being located on said conveyor bench downstream of said one of said second layers, so that said one of said second layers is placed on said one of said first layers, and transfers said one of said first layers and said one of said second layers to said package forming area; then prepares to engage another one of said second layers from the conveyor bench by reversing the direction of the at least one oscillatory arm; and
    wherein said at least one oscillatory arm and said conveyor bench are vertically displaced relative to each other during transfer of said one of said first layers and said one of said second layers to said package forming area.

2. The packaging machine as claimed in claim 1, wherein said transfer means defines a loading position, and wherein when the transfer means is in the loading position, said at least one oscillatory arm is located adjacent to and downstream of the pin of said conveyor bench which positions said one of said second layers.

3. The packaging machine as claimed in claim 1, wherein said magnetic head is movable between first position located below said one of said second layers and a second position located above said one of said first layers.

4. The packaging machine as claimed in claim 3, further comprising layer lifting means for lifting said one of said first layers into engagement with said magnetic head when said magnetic head is in said second position.

5. The packaging machine as claimed in claim 1, wherein said package forming area is located immediately downstream of the conveyor bench.

6. The packaging machine as claimed in claim 1, wherein said transfer means is movable between a loading position where the one of said first layers and the one of said second layers on the conveyor bench are engaged and a delivery position where the one of said first layers and the one of said second layers are placed in the package forming area, and wherein said oscillatory arm and said conveyor bench are reciprocatingly displaced relative to each other as the transfer means moves between the loading position and the delivery position.

7. The packaging machine as claimed in claim 6, wherein said at least one oscillatory arm and said conveyor bench are reciprocatingly displaced relative to each other by raising and lowering at least an end part of said conveyor bench.

8. A packaging machine to package sections in alternating layers using a single set of magnetic heads, comprising:
    a conveyor bench which delivers alternate first and second layers of sections, one of said first and second layers having N sections and the other of said first and second layers having N−1 sections, said conveyor bench having a plurality of pins which position the first and second layers on the conveyor bench;

a package forming area for the formation of packages of a plurality of said first and second layers of sections; and transfer means for transferring said first and second layers from said conveyor bench to said package forming area and for forming packages at said package forming area, said transfer means being located adjacent to said package forming area, and comprising at least one oscillatory arm and at least one magnetic head attached to said at least one oscillatory arm which can engage the layers;

wherein said transfer means engages one of said second layers located on said conveyor bench, inverts said one of said second layers, engages one of said first layers, said one of said first layers being located on said conveyor bench downstream of said one of said second layers, so that said one of said second layers is placed on said one of said first layers, and transfers said one of said first layers and said one of said second layers to said package forming area;

wherein said at least one oscillatory arm and said conveyor bench are vertically displaced relative to each other during transfer of said one of said first layers and said one of said second layers to said package forming area; and wherein said transfer means is movable between a loading position where the one of said first layers and the one of said second layers on the conveyor bench are engaged and a delivery position where the one of said first layers and the one of said second layers are placed in the package forming area, and wherein said oscillatory arm and said conveyor bench are reciprocatingly displaced relative to each other as the transfer means moves between the loading position and the delivery position;

further comprising an oscillation pivot about which said oscillatory arm pivots, and said oscillatory arm and said conveyor bench are reciprocatingly displaced relative to each other by raising and lowering said oscillation pivot.

9. The packaging machine as claimed in claim 6, wherein said magnetic head is connected to an upper end part of the oscillatory arm, and wherein said oscillatory arm and said conveyor bench are reciprocatingly displaced relative to each other by raising and lowering at least said upper end part of the oscillatory arm.

10. The packaging machine as claimed in claim 1, further comprising an axis attached to said oscillatory arm about which said magnetic head rotates so as to invert said one of said second layers after the magnetic head engages said one of said second layers.

11. The packaging machine as claimed in claim 10, wherein the magnetic head rotates 180° so as to bring the sections of said one of said second layers into alignment with spaces located between the sections of said one of said first layers.

12. A packaging machine to package sections in alternating layers using a single set of magnetic heads, comprising:

a conveyor bench which delivers alternate first and second layers of sections, one of said first and second layers having N sections and the other of said first and second layers having N−1 sections, said conveyor bench having a plurality of pins which position the first and second layers on the conveyor bench;

a package forming area for the formation of packages of a plurality of said first and second layers of sections; and transfer means for transferring said first and second layers from said conveyor bench to said package forming area and for forming packages at said package forming area, said transfer means being located adjacent to said package forming area, and comprising at least one oscillatory arm, at least one magnetic head attached to said at least one oscillatory arm which can engage the layers, a slotted link, a rotary cam which actuates said slotted link, and an oscillation pivot attached to said slotted link about which said oscillatory arm pivots;

wherein said transfer means engages one of said second layers located on said conveyor bench, inverts said one of said second layers, engages one of said first layers, said one of said first layers being located on said conveyor bench downstream of said one of said second layers, so that said one of said second layers is placed on said one of said first layers, and transfers said one of said first layers and said one of said second layers to said package forming area;

wherein said at least one oscillatory arm and said conveyor bench are vertically displaced relative to each other during transfer of said one of said first layers and said one of said second layers to said package forming area.

13. The packaging machine as claimed in claim 12, wherein said transfer means further comprises an auxiliary arm pivotably connected to said slotted link and a bar pivotably connected to said auxiliary arm and to said oscillatory arm.

14. The packaging machine as claimed in claim 13, further comprising an arm connected to the auxiliary arm which causes the oscillatory arm to oscillate.

15. The packaging machine as claimed in claim 1, wherein said transfer means further comprises a first shaft about which said magnetic head pivots, and means for maintaining the magnetic head horizontal during movement of said oscillatory arm comprising a second shaft connected to the first shaft.

16. The packaging machine as claimed in claim 1, wherein said conveyor bench is located adjacent to the package forming area.

* * * * *